May 12, 1925.
C. R. GRIFFITH
APPARATUS FOR DEWATERING SLUDGE
Filed June 21, 1922
1,537,818
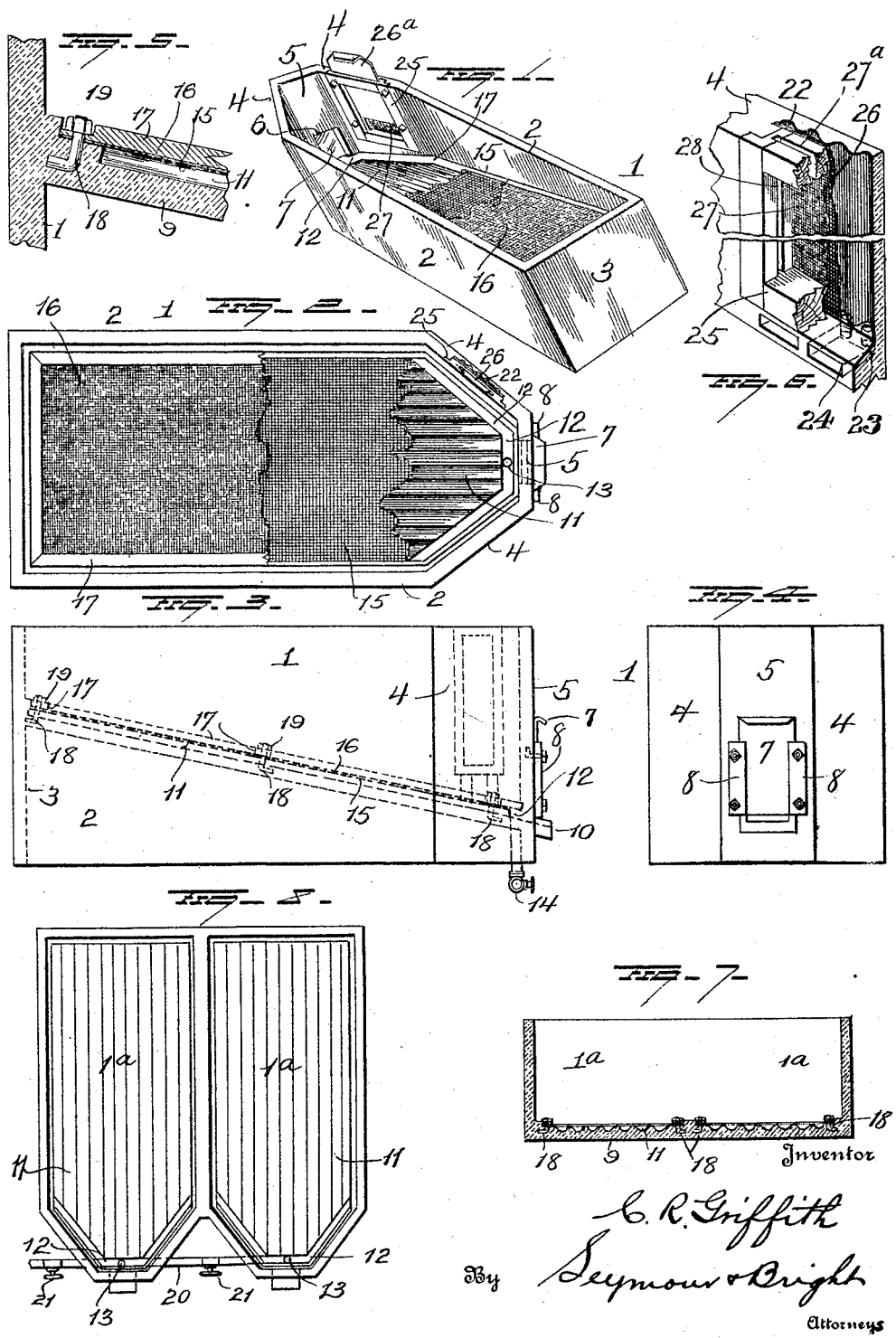

Patented May 12, 1925.

1,537,818

UNITED STATES PATENT OFFICE.

CHARLES R. GRIFFITH, OF SOUTH MANCHESTER, CONNECTICUT.

APPARATUS FOR DEWATERING SLUDGE.

Application filed June 21, 1922. Serial No. 569,902.

*To all whom it may concern:*

Be it known that I, CHARLES R. GRIFFITH, a citizen of the United States, and a resident of South Manchester, in the county of Hartford and State of Connecticut, have invented certain new and useful Improvements in Apparatus for Dewatering Sludge; and I do hereby declare the following to be a full, clear, and exact description of the invention, such as will enable others skilled in the art to which it appertains to make and use the same.

This invention relates to improvements in apparatus for dewatering sludge and the like.

In processes of water purification, and particularly in the treatment of industrial waste and domestic sewage for the removal of polluting materials, the resultant sludge is composed of such material as comprises constituents which are valuable for fertilizing purposes and while such material when contained in the water will pollute the water of a stream or river if permitted to enter the same with domestic sewage or water from industrial plants, it constitutes, nevertheless, a valuable product of the water purification process.

The sludge as recovered from the water purifying apparatus is in a semi-fluid state and in order that it may be reduced to a more solid condition so that it may be readily handled, it is necessary that the excess of water shall be removed.

One object of my present invention is to provide simple and efficient means whereby excess of water in the sludge resulting from the purification of water from industrial waste or domestic sewage, may be quickly and effectually removed without the application of pressure, so that the sludge may be handled readily with a shovel.

With this and other objects in view, the invention consists in certain novel features of construction and combinations of parts as hereinafter set forth and pointed out in the claims.

In the accompanying drawings; Figure 1 is a perspective view of a dewatering tank embodying my improvements; Figure 2 is a plan view; Figure 3 is a side elevation; Figure 4 is a front end view, and Figures 5 and 6 are enlarged views showing certain details of construction, and Figures 7 and 8 are views illustrating a tank structure comprising a plurality of units built together.

In the embodiment of the invention shown in the drawings, 1 represents a tank which may be made of wood, concrete or other suitable material and comprises side walls 2, 2, connected by a rear wall 3, and the forward portions of said side walls converge as shown at 4 to a comparatively narrow front end wall 5,—the latter being provided with a sludge outlet 6 which may be closed by a slide gate 7 movable in guides 8 secured to said front end wall.

The tank 1 is provided therein with a platform or bottom member 9 which inclines from the rear wall (somewhat below the top of the latter) to the front end of the tank near the bottom thereof,—a spout 10 being located near the front end of said platform or bottom member 9 and projecting outwardly from the end wall 5 at the bottom of the sludge outlet 6.

The inclined platform or bottom member 9 is provided with parallel corrugations 11 forming parallel channels or gutters which extend from the rear upper end of the same and terminate somewhat rearwardly of the forward walls 4 and 5 of the tank, where a water-receiving gutter 12 is formed, into which the gutters formed by the corrugations 11 discharge. A water discharge pipe 13 communicates with an intermediate portion of the gutter 12 and may be provided with a valve 14.

A sheet of fine mesh wire netting 15 is located over the corrugations of the platform or bottom member 9 and serves as a supporting means for a sheet of fabric screening cloth 16, said sheets being held in place by suitable clamping strips 17 secured to edge portions of the platform or bottom member 9, by means of bolts 18. These bolts may be made L-shaped and when the tank is constructed of concrete, they may be embedded in the same and provided with projecting ends to pass through holes in said strips and threaded to receive nuts 19.

If desired, the tank may be made to form a plurality of units, two such connected units 1ª, 1ª made in a single structure being represented in Figures 7 and 8, and where such construction is employed, the main gutters 12 of the plurality of units may be connected with a common water discharge pipe 20 provided with valves 21.

When semi-liquid sludge is deposited into the upper portion of the tank it will gravitate toward the forward portion of the latter but no pressure will be applied to force the water from the sludge. Water contained in the sludge will gradually seep through the fabric screen cloth and, passing through the meshes of the supporting screen of wire netting, it will enter the gutters or channels formed by the corrugated platform or bottom member and flow through the latter to the main gutter 12 at the lower end of said platform or bottom member,—the water finally escaping through the pipe 13.

When the semi-liquid is deposited in the tank, the solids will become precipitated somewhat rapidly leaving only floculent solids in the water over the precipitated solids. In order to facilitate the speed of the dewatering operation, it is desirable that such water be drawn off without permitting the escape of solids with it, and for this purpose means such as will now be described, may be employed.

In the drawings, I have shown water discharging and filtering means located in one of the forward converging walls 4 of the tank, but it will be understood that any desired number of such water discharging and filtering means may be employed and variously located in the walls of the tank, as may be found to be desirable and in accordance with the capacity of the tank. The details of construction forming the said water discharging and filtering means are shown in Figure 6 of the drawing, wherein the wall 4 is shown as being recessed and formed with vertical corrugations providing vertical channels or gutters 22 and the lower ends of the latter are connected by ducts 23—24 with the main water discharge gutter 12. A frame 25 is located in the recessed portion of the tank wall 4 and has secured thereto, sheets of wire netting 26 and screening cloth 27, so as to dispose the same in front of said corrugations and interposed channels or gutters and strain the water discharged through the vertical channels or gutters 22. In order that the screening or straining cloth may be kept clean when the semi-liquid sludge is first discharged into the tank and before the solids shall have settled, and for the purpose of controlling the passage of water to the vertical channels or gutters 22, a slide or cover 26ᵃ is employed and supported by the frame 25, the latter being slotted as at 27ᵃ and grooved as at 28 for the accommodation of said slide or cover.

After the water shall have been permitted to gravitate out of the sludge and the top water drawn off, the consistency of the sludge will be such that it may be readily handled with a shovel and it may be discharged from the tank through the sludge outlet 6. By proper manipulation of the gate 7, the sludge from which water has been drained may be permitted to discharge gradually and nearly continuously, while sludge to be de-watered may be fed periodically or nearly continuously to the tank.

My improvements operate effectually to de-water sludge and avoid necessity for the use of agitating means or apparatus to create pressure. In fact, the use of such instrumentalities are particularly undesirable.

While I have described my improvements in connection with the dewatering of sludge from industrial waste and domestic sewage to recover the valuable residue in such form that it may be readily handled, it will be understood that other semi-liquids may be treated to recover valuable constituents thereof, and the term "sludge" as used herein should be construed to comprehend any valuable solid constituent which it may be desired to recover from a semi-liquid mixture.

Various changes might be made in the details of construction of my invention without departing from the spirit of the latter or limiting its scope as defined in the appended claims, and hence I do not restrict myself to the precise details herein set forth.

Having fully described my invention what I claim as new and desire to secure by Letters-Patent, is:—

1. Dewatering means comprising a tank, an inclined bottom member therein having longitudinal channels, screening cloth supported over said channels, said tank having a gutter communicating with said channels, means for discharging water from said gutter, vertical channels in a wall of said tank at the lower end of the bottom communicating with the gutter, screening cloth in front of said vertical channels, and a cover for said last mentioned screening cloth slidably mounted in the wall of the tank.

2. Dewatering means comprising a tank, an inclined bottom member in said tank having channels, said tank having a gutter communicating with the lower ends of said channels, means for discharging water from said gutter, screening cloth supported over said channels, a wall of said tank having a recess and vertical channels in the back wall of the recess communicating with said gutter, a frame located in the recess in the tank wall, screening cloth secured to said frame and disposed in front of said vertical channels, and a slide mounted in said frame and operable to cover said last-mentioned screening cloth.

In testimony whereof, I have signed this specification in the presence of two subscribing witnesses.

CHARLES R. GRIFFITH

Witnesses:
WILLIAM S. HYDE,
WALTER A. SMITH.